United States Patent [19]
Smith

[11] 3,981,442
[45] Sept. 21, 1976

[54] AIRCRAFT ENGINE AUTOMATIC THROTTLE CONTROL WITH AUTOMATIC GAIN PROGRAMMING SYSTEM

[75] Inventor: Harry D. Smith, Scottsdale, Ariz.

[73] Assignee: Sperry Rand Corporation, New York, N.Y.

[22] Filed: Aug. 15, 1975

[21] Appl. No.: 605,082

[52] U.S. Cl............................. 235/150.2; 244/182
[51] Int. Cl.²......................................... B64C 13/18
[58] Field of Search................... 235/150.2, 150.22; 244/77 D, 77 A, 182; 73/178 R, 178 T

[56] References Cited
UNITED STATES PATENTS

| | | | |
|---|---|---|---|
| 3,627,236 | 12/1971 | Hess.................................. | 244/77 D |
| 3,691,356 | 9/1972 | Miller............................ | 235/150.22 |
| 3,892,374 | 7/1975 | Lambregts....................... | 235/150.2 |
| 3,901,466 | 8/1975 | Lambregts........................ | 244/77 D |
| 3,908,934 | 9/1975 | Schloeman....................... | 235/150.2 |

Primary Examiner—Joseph F. Ruggiero
Assistant Examiner—Errol A. Krass
Attorney, Agent, or Firm—Howard P. Terry

[57] ABSTRACT

An automatic throttle system operable during all flight regimes includes automatic gain control apparatus for minimizing changes in engine thrust during the cruise mode caused by air mass turbulence and provides desirable response to commanded changes in air speed or flight path while maintaining desirable response to large magnitude wind shears. The gain of the air speed error signal is controlled as a function of Mach or true air speed and the gain of the throttle rate command signal normally controlling the engine throttle servo motor is controlled as a function of the commanded change in air speed, the air speed error, the aircraft's Mach or true air speed, and altitude rate by a real time logical control system.

11 Claims, 2 Drawing Figures

AIRCRAFT ENGINE AUTOMATIC THROTTLE CONTROL WITH AUTOMATIC GAIN PROGRAMMING SYSTEM

CROSS-REFERENCE TO RELATED PATENTS AND PATENT APPLICATIONS

The apparatus of the present invention is closely related to the aircraft speed command and throttle control systems disclosed in the H. Miller U.S. Pat. No. 3,522,729 for an "Airspeed Command System" issued Aug. 4, 1970 and U.S. Pat. No. 3,691,356 for a "Speed Command and Throttle Control System for Aircraft" issued Sept. 12, 1972, both patents being assigned to Sperry Rand Corporation. The present invention is an improvement over that of the R. W. Schloeman U.S. patent application Ser. No. 421,003, filed Dec. 3, 1973 for a "Programmed Gain Control for Aircraft Throttle Control System", also assigned to Sperry Rand Corporation issued as U.S. Pat. No. 3,908,934 Sept. 30, 1975.

BACKGROUND OF THE INVENTION

1. Field of the Invention

The present invention relates generally to automatic throttle control systems for aircraft and more specifically to an improved automatic gain control arrangement for such systems whereby desirable operation is achieved under all operating modes including climb, descent, steady state cruise, and approach modes of operation.

2. Description of the Prior Art

In the past, automatic throttle control systems, especially those for large aircraft used by commercial airlines and military transport groups, were employed primarily during the approach to landing mode where tight flight path control is required and during which very high throttle control gains are required to provide fast response to air speed changes, such as produced by gusts, wind shear, and the like. Later, autothrottle control usage was extended to take off and initial climb out and was sometimes used during the let down modes but still not generally used during cruise modes. More recently, and as represented in the aforementioned Miller U.S. Pat. No. 3,691,356, automatic control of the aircraft throttles has been extended to use in all modes, including the climb-to-cruise altitude, extended cruise, long-term let down, holding pattern, extended approach, final approach, and go-around modes.

Normally, the aircraft aerodynamic configuration that is determines in part by the degree of extension of the flaps, slats, and other aerodynamic surfaces will differ during most of these various operating modes. Clearly, an autothrottle system with a fixed gain characteristic is far from desirable and usually unacceptable for such operation. For example, the high gain required for tight air speed control during let down, or approach modes will result in undesirable throttle activity during the cruise modes where tight control of air speed is, in fact, not required. Stated another way, during the cruise mode, it is desirable to minimize throttle activity and the degree of engine thrust variations at the expense of tight air speed control, especially in the presence of turbulence. However, there are circumstances during cruise in which it is desired to tighten the autothrottle system response, for example, when the pilot desires to change his air speed and when flight path changes are made, as when a push-over is effected during cruise to reach a lower altitude. In considering such needs, the requirement must be borne in mind that maximum gain must be provided at lower air speeds, particularly at approach to landing air speeds.

As disclosed in the Miller U.S. Pat. No. 3,691,356, the full time autothrottle control system is made practical largely because of an engine protection control disclosed therein as the thrust rating control. This control overrides autothrottle control in the air speed control loop and thus prevents engine overboost. The thrust rating computer generates a parmeter, such as the speed of the low speed rotor normally attached to the fan, indicative of maximum engine thrust performance under the existing operating conditions of the engine.

In the aforementioned Schloeman application, now U.S. Pat. No. 3,908,934 the reduction of engine throttle activity during cruise is accomplished generally by reducing the system gain as a function of indicated air speed whereby, at high air speeds, the system gain is low as is desired for reduced throttle activity. To provide the desired higher response to air speed changes commanded by the pilot or required during flight path changes, the gain is increased as a function of air speed error, that is, the difference between the actual and commanded air speed, the maximum error or error limit being effective above some predetermined air speed. While this gain control arrangement is generally satisfactory in most applications, it may not be entirely satisfactory in other applications for several reasons.

The response of large turbofan powered aircraft, in the high speed cruise mode, to throttle advance or retard commands is inherently sluggish as compared to the response to the same commands in the low speed and approach modes. This characteristic leads to operation as an underdamped control system at high air speeds. Reducing the system gain at high air speeds therefore tends to aggravate this inherent underdamped characteristic. Because aircraft automatic throttle control systems are inherently non-linear servo systems, the gain programming of such a system as a function of air speed error tends to reduce its apparent damping characteristic. Thus, a reduction of gain for small air speed errors will result in a very poorly damped control system. Furthermore, aircraft autothrottle control systems usually include substantial hysteresis effects associated with the physical coupling between the throttle controls levers and the engine fuel control apparatus and this hysteresis, coupled with an underdamped throttle level control servo loop response, may result in long period, low amplitude oscillations. The foregoing characteristics of an air speed error controlled gain program will render the autothrottle control system excessively responsive to turbulence which, in turn, results in increasing throttle activity without effectively reducing the unwanted air speed error.

SUMMARY OF THE INVENTION

The automatic throttle control system of the present invention serves to overcome all of the problems associated with prior systems by providing two basic gain control functions. The first gain control provides for continuous variation of the air speed error signal as a function of Mach speed, while the second provides for temporarily varying the throttle rate command as a function of commanded air speed, air speed error, altitude rate, aircraft Mach speed, and real time. The first gain variation serves to prevent the system from becoming underdamped because of the inherent lengthening of the basic aircraft time constant with increased air speed (speed versus thrust variations) and also due to the reduction in system gain produced by the characteristic of the second gain control. The second gain control basically varies the throttle rate command signal as a dual slope function of Mach speed (a function having a high gain slope or a low gain slope).

The low gain slope is normally maintained unless the pilot commands a new air speed or there is a vertical speed in excess of a predetermined value caused by a change in flight path, under which circumstances the high gain slope is rendered effective and remains effective for a predetermined time period after the air speed error produced thereby has been reduced to a predetermined low value. Thus, the throttle control system gain program of the present invention serves to provide the desired reduction in throttle activity during the higher speed cruise modes, yet provides high response to air speed and flight path changes. A the same time, desirable system damping characteristics are maintained during all modes of operation of the aircraft. While in the specific embodiments illustrated, Mach air speed is employed as the primary gain controlling parameter, it will be understood that true air speed may be preferred if readily available. However, Mach air speed is a very close approximation of true air speed; therefore, in the detailed presentation of the invention, it will be understood that Mach speed and true air speed may be used interchangeably.

DESCRIPTION OF THE PREFERRED EMBODIMENTS

Figure 1:
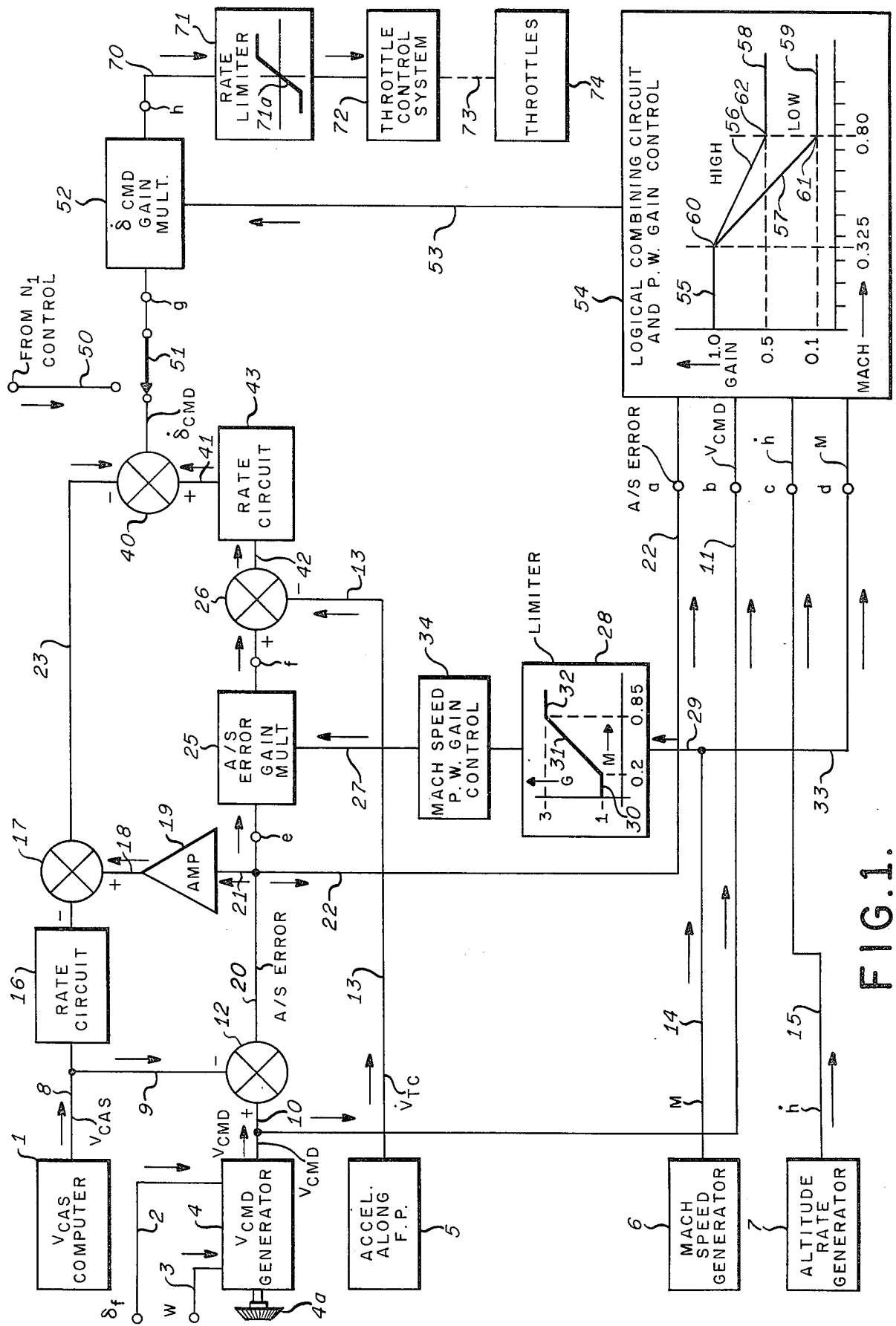
FIG. 1 is a block diagram of the throttle control system of the present invention including illustrations of typical gain characteristics.
Figure 2:
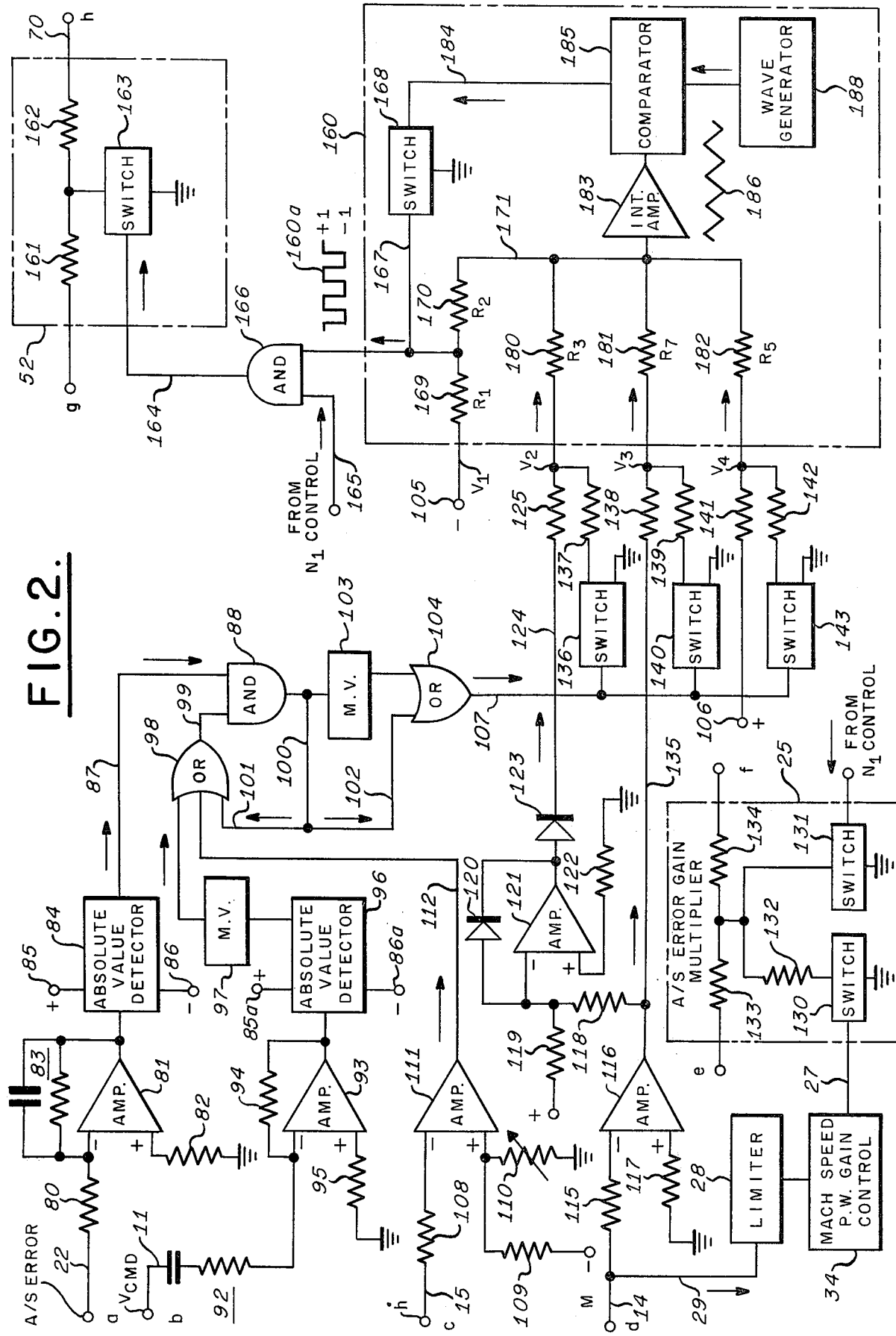
FIG. 2 is a detailed schematic illustration of the gain control programming apparatus included within corresponding blocks of FIG. 1.

FIG. 1 serves generally to show the characteristic parts of the invention and their interconnections so as to contrast the invention with respect to the prior art and to serve to locate in the new throttle control system its novel parts as shown in more particular detail in FIG. 2. For example, with respect to the prior art, the following control signals originating in conventional sensors normally present in the aircraft to be served are used in a novel manner in the present invention in contrast to those previously used:

$V_{CAS}$ = calibrated craft air speed,
$\delta_f$ = flap position,
$W$ = aircraft weight,
$\dot{V}_{TC}$ = acceleration along the craft flight path,
$M$ = Mach air speed, and
$\dot{h}$ = craft altitude rate.

An electrical quantity $\delta_f$ proportional to flap position and an electrical quantity $W$ proportional to aircraft weight are respective inputs on leads 2 and 3 of the conventional $V_{CMD}$ generator 4 of FIG. 1, an adjustable device adapted to calculate a voltage quantity proportional to the desired or command air speed $V_{CMD}$ on its output lead 10 from a manually selected airspeed input on knob 4a. The quantity $\delta_f$, whose amplitude is proportional to flap position, is received on lead 2 from a conventional flap position transducer (not shown). The quantity $W$ is proportional to craft weight and may be generated in a conventional manner by apparatus such as that shown in FIGS. 9 and 10 of the aforementioned Miller U.S. Pat. No. 3,691,356. The $V_{CMD}$ generator 4 is well known in the art and may take the form shown in FIG. 2 of the Schloeman patent application now U.S. Pat. No. 3,908,934.

A conventional calibrated air speed computer 1 or air data computer is provided for generating the calibrated craft air speed signal $V_{CAS}$, which then is applied via lead 8 to a conventional rate circuit 16 and via the branching lead 9 to a conventional summation device 12. Rate circuit 16 may have a transfer characteristic $K_1 s/(K_2 s + 1)$ where, in a typical installation, $K_1 = 0.925$ and $K_2 = 5$. A second input of summation device 12 received the output of $V_{CMD}$ generator 4, these inputs being polarized as indicated in the figure. In view of the action of summation device 12, its output on lead 20 is the difference between the actual and commanded craft air speeds, or air speed error, which term is then used as a principal control term in the novel throttle control apparatus. The air speed error signal on lead 20 is supplied to branching leads 21 and 22 and also through junction e to the air speed error gain multiplier 25 whose operation will be further described.

The output of device 25 multiplied or amplified according to a control voltage on lead 27, is applied through junction f to the conventional algebraic summation device 26. An additional input, appearing on lead 13 and polarized as indicated in the drawing, is supplied to algebraic summation device 26; the signal applied via lead 13 is a voltage $\dot{V}_{TC}$ proportional to acceleration of the aircraft along its flight path. The value $\dot{V}_{TC}$ may be generated by any of several alternative conventional methods, including its generation by a speed parameter computer such as described in connection with FIGS. 2 and 11 of the Miller U.S. Pat. No. 3,691,356. The value $\dot{V}_{TC}$ serves as a low frequency damping term in the system.

As a result of the summation by device 26, a voltage appears on lead 42 representing components of a modified air speed error and craft acceleration along the flight path and this combination of signals is applied to the conventional rate circuit 43 and thence through lead 41 as one input of the further algebraic summation device 40 to which a second input is applied in the indicated polarity via lead 23.

For generating this second input, the calibrated craft air speed signal $V_{CAS}$, as modified by an additional rate circuit 16, is supplied to an additional algebraic summation device 17, to a second input of which, in the relative polarity indicated in the figure, is supplied via leads 21 and 18 and through amplifier 19, if amplification is required, the air speed error signal appearing on lead 20. The rate circuit 43 is a conventional circuit for generating the rate of change with time of the signal on lead 42 so that the output of the network is a bandwidth-limited rate voltage. It may have a transfer function characteristic $K_4 s/(K_4 s + 1)$, where $K_4 = 8$, for example. The algebraic summation of the inputs to the summing device 17 is thus found on lead 23 as the required second input to summation device 40, both inputs to device 40 representing rate terms and being algebraically summed in the polarities indicated to generate the command signal $\delta_{CMD}$ at the input of switch 51. The latter switch may, in certain circumstances yet to be described, be moved to connect to lead 50 on which appears the aforementioned engine overboost protection control error signal $N_1$.

In this manner, the control signal $\delta_{CMD}$ is coupled to junction g of the $\delta_{CMD}$ gain multiplier 52 having an output terminal h. The gain multiplier 52, like Mach speed gain multiplier 25, functions to multiply or to amplify its primary input signal by a control signal appearing on lead 53, as will be further discussed. Inspection of FIG. 2, which illustrates the gain multipliers 25 and 52 in greater detail, also shows how the gain multiplier circuits of FIG. 2 are respectively connected between junctions e and f and g and h.

The output of multiplier 52 is used to control the setting of the throttles 74 of the aircraft engine. Before such use, this rate output signal may be subjected to the limiting action of rate limiter 71, whereupon it is integrated within the conventional throttle control system 72 to control throttle position by means of the mechanical linkage 73. Throttle rate limiter 71 when placed at the input of the throttle control servo system 72 for operation of the conventional throttle system preferably has the conventional generally symmetric limiting characteristic illustrated by graph 71a. The throttle control servo 72 controlled by the output of throttle rate limiter 71 may include an input filter and a conventional power servo amplifier for control of the throttle actuator or actuators of throttle system 74 through linkage 73.

By way of example, the dual channel throttle control system of the H. Miller U.S. Pat. No. 3,504,248, issued Mar. 31, 1970 for a "Dual Channel Servo Having Torque Equalization" and assigned to the Sperry Rand Corportion may be used with the present invention, since it has desirable fail-operational characteristics whereby no single failure can interfere with satisfactory operation of the system. Furthermore, it will be understood by those skilled in the art that the described combinations of polarities for the ports of the several summation circuits of FIG. 1 may be systematically altered, still achieving the desired control over the nature of the output signals operating throttle control 72.

A significant feature of the invention lies in the configuration for controlling of the airspeed error gain multiplier 28 and the $\delta_{CMD}$ gain multiplier 52. For this purpose, the signals representing airspeed error, $V_{CMD}$, and $\dot{h}$, and M are beneficially employed. The output voltage M or Mach speed generator 6 and the signal representing altitude rate $\dot{h}$ from generator 7 appear on the respective leads 14 and 15 and are employed in generating signals for controlling the gain multipliers 25 and 52. The signal M on lead 14 from Mach speed generator 6 is supplied by branching lead 29 as a control signal for determining the operation of the Mach speed gain control 28 which latter, in turn, provides a control voltage via lead 27 for determining the effective gain of air speed error gain multiplier 25. The structure and operation of these circuits will be discussed in further detail, as will the structure and operation of the logical combining circuit and gain control 54 with respect to its control of gain multiplier 52. It will be seen that device 54 is one of the significantly novel elements of the present invention and that is provides a control signal via lead 53 for determining the gain of gain multiplier 52.

For the latter purpose, the logical combining circuit and gain control 54 employs several input signals; for example, it again employs the Mach speed signal from generator 6 as supplied by lead 14 and the branching lead 33. A further input to device 54 is the air speed error output of summation device 12, it being supplied to device 54 over lead 22. The signal $V_{CMD}$ from the $V_{CMD}$ generator 4 is coupled via lead 11 to an additional input of device 54. Finally, the altitude rate voltage $\dot{h}$ from the conventional altitude rate generator 7 is coupled to device 54 via lead 15. With respect to FIG. 2, which will be employed to explain the invention in greater detail, the structure and operation of the logical combing circuit and gain control will be discussed in particular detail, the detailed circuit of FIG. 2 being arranged for coupling at junctions a, b, c, and d in FIG. 1.

It will be seen from FIG. 2 that signals introduced into the logical combining circuit and pulse width gain control 54 of FIG. 1 are processed in FIG. 2 so as to determine the effective gain or multiplication ratio of multiplier 52. This is accomplished by processing and combining several input signals to derive voltages $V_1$, $V_2$, $V_3$, and $V_4$ that are the inputs of the signal processor circuit 160. In device 160, as will be discussed in further detail, the several input voltages are combined in such a manner as to control the pulse width modulation index of an output pulse trail 160a. The latter is fed to control the relative time of conduction of shunt switch 163 of currents flowing to ground within multiplier 52. Multiplier 52 is generally similar to apparatus described in FIG. 1 of the aforementioned Schloeman patent application now U.S. Pat. No. 3,908,934 and elsewhere, with shunt switch 163 being connected to the common junction of the series connected resistors 161, 162 that are coupled between the junctions g and h of FIG. 1. In this manner, as the degree of pulse width modulation changes, the relative durations of the positive and negative excursions of wave train 160a change. In turn, a correspondingly varying portion of the signal which would otherwise pass from junction g to junction h is dumped to ground.

In further detail, the air speed error signal on lead 22 is applied through input resistor 80 to one input of amplifier 81, the other input, polarized as indicated in the drawing, being connected through resistor 82 to ground. The output of amplifier 81 is coupled to its input via resistance-capacitance network 83 which may have, for example, a transfer characteristic according to the function $1/(K_6s+1)$. The output amplifier 81 is coupled through the absolute value detector 84, this circuit having the general construction shown in FIGS. 1 and 4 of the aforementioned Schloeman patent application now U.S. Pat. No. 3,908,934 and being supplied with positive and negative reference voltages on terminals 85 and 86 by a conventional power supply (not shown). The output of absolute value detector 84 appears on lead 87 and is coupled to the conventional AND circuit 88. The absolute value circuit 84 is a circuit adapted, in effect, for rectifying both polarities of a bipolar input signal so that a signal of only one predetermined polarity appears at its output for application to AND circuit 88.

The command speed signal appearing on lead 11 is coupled through the series capacitance-resistance network 92 to one input of amplifier 93, its second input being coupled, in the polarity indicated, to ground through resistor 95. Resistor 94 couples the input and output terminals of amplifier 93 and its output is supplied to a second absolute value detector 96 similar in nature to detector 84 and similarly supplied with reference potentials at terminals 85a and 86a. Before being coupled as an input to the conventional OR circuit 98, the output of detector 96 is supplied to multivibrator 97, which may be a one-shot multivibrator rendered conductive, for example, for a 10 second period by a predetermined output of detector 96.

A second input to OR circuit 98 is derived from the altitude rate signal $\dot{h}$ on lead 15, which lead is coupled via resistor 108 to one input of amplifier 111. The second input of amplifier 111 is coupled to ground through adjustable resistor 110, supplied for calibration purposes, and is additionally coupled through resistor 109 to a negative power supply (not shown). The output of amplifier 111 is then coupled via lead 112 as a second input to OR circuit 98.

The output of OR circuit 98 is used to generate a third or fed back input for controlling OR circuit 98. This is achieved by coupling the signals on leads 87 and 99 to AND circuit 88 and by coupling the output of the latter via leads 100 and 101 to the third input of OR circuit 98. The output of AND circuit 88 is additionally coupled to a multivibrator 103, which may be a single shot circuit providing, for example, a sixty second duration output when triggered. This output is fed to OR circuit 104 as is also the output of AND circuit 88 via the branch lead 102. The output of OR circuit 104 is employed to actuate several shunt switches for the purpose of dumping certain signals, as will be described, to ground under predetermined circumstances. The signals that are controlled in this manner make up the signals providing voltages $V_2$ and $V_3$ and originate in the Mach speed generator 6 of FIG. 1.

To provide voltages $V_2$ and $V_3$, the Mach speed signal M on lead 14 is coupled through input resistor 115 to amplifier 116, the other input of amplifier 116 being coupled to ground through resistor 117. The amplified output of circuit 116 is coupled via lead 135 and through resistor 138 to supply the voltage $V_3$ at one input of processor 160.

The output of amplifier 116 is further processed to form the voltage $V_2$ at a second input of processor 160. For this purpose, the output of amplifier 116 is coupled through resistor 118 to one input of a further amplifier 121. That same input terminal of amplifier 121 is supplied with a reference voltage through resistor 119 from a conventional power supply (not shown). The input terminal is additionally coupled to the output of amplifier 121 through diode 120, poled as indicated in the drawing. The second input of amplifier 121 is connected through resistor 122 to ground. Past the junction of diode 120 and the amplifier 121 output is a series connected diode 123, poled as indicated in the drawing which is, in turn, coupled through lead 124 and resistor 125 to supply voltage $V_2$ to the second input of processor 160. To complete the supply of signals to processor 160, a voltage $V_1$ is supplied to a further input of processor 160 from a conventional power supply (not shown) coupled to terminal 105. In a similar manner, a voltage $V_4$ is supplied by a conventional power supply (not shown) coupled at terminal 106 through resistor 141 to a fourth input of processor 160.

According to the invention, voltage $V_1$ is continuously supplied, but the application of voltages $V_2$, $V_3$, and $V_4$ is controlled according to the output of OR circuit 104. This signal is supplied via lead 107 to shunt switches 136, 140, and 143. Shunt switch 136 is coupled between resistor 125 and processor 160 through resistor 137 and to ground and thus, when actuated, tends to dump the voltage $V_2$ to ground. Shunt switch 140 is coupled between resistor 138 and processor 160 through resistor 139 and to ground and thus, when actuated, tends to dump the voltage $V_3$ to ground. Similarly, shunt switch 143 is coupled between resistor 141 and processor 160 through resistor 142 and to ground and thus, when actuated, tends to dump the voltage $V_4$ to ground. Accordingly, in dependence upon the presence or absence of an output from OR circuit 104, the levels of voltages $V_2$, $V_3$, and $V_4$ at the several inputs of processor 160 are controlled. Processor 160 contains a resistance network acting as a signal combining device with respect to voltages $V_1$, $V_2$, $V_3$, and $V_4$. The signal $V_1$ on terminal 105 is coupled to series connected resistors 169 and 170, where resistor 170 acts as a load resistor. The voltage $V_2$ is connected to the input of resistor 180, voltage $V_3$ to the input of resistor 181, and voltage $V_4$ to the input of resistor 182. The end of resistor 170 remote from terminal 105 and the output ends of resistors 180, 181, and 182 are connected to a common voltage-level-determining conductor 171.

In the combining resistor network of processor 160, a summing or forcing function is formed in the general manner described in the aforementioned Schloeman patent application now U.S. Pat. No. 3,908,834 with the negative reference signal of terminal 105, appearing across resistors 169 and 167, the positive reference signal on terminal 106 appearing across resistor 182, and the output of amplifier 116 being conveyed via lead 135 across resistor 181. The amplified output of amplifier 121 is passed through the biased diode 123 and is placed across resistor 180. As noted, the output ends of the several resistors 169 through 182 are coupled to the input terminal of integrating amplifier 183 by the common lead 171. The forcing function of the resistor network is such that the sum of the currents entering the nodal conductor 171 must be driven to zero. The analog voltage level at the output of integrating amplifier 183 is supplied to an arrangement consisting of comparator 185 and a wave generator 188 for supply of the regular triangular wave 186. Circuit elements 185 and 188 together convert the unipolar analog output of circuit 183 into a train of variable duration pulses for controlling the cyclic relative conductivity time of shunt switch 168 which switch, in the general manner of the Schloeman circuit, dictates the relative time that the junction between resistors 169 and 170 is grounded, thus providing the variable duration pulse train 160a to control operation of the shunt switch 163 in multiplier 52. Shunt switch 163, when conducting periodically, drops the common junction between resistors 161, 162 to ground, thus determining the total current flow from terminal g to terminal h and serving as a gain multiplier as discussed relative to FIG. 1. The presence of AND gate 166 in lead 164 permits a logic control signal from $N_1$ control to over-ride signal 160a in the event of a tendency toward engine overboost.

As shown in FIG. 1, a further major function performed according to the invention provides a gain control of the air speed error signal as modified function of Mach air speed before that air speed error voltage is further modified and supplied to the $\delta_{CMD}$ gain multiplier 52 as described in the foregoing. In this manner, the control of throttles 74 is also made to be a function of the Mach air speed M supplied via leads 14 and 29 by generator 6 to the conventional limiter 28. The latter has the characteristic behavior illustrated by curve 30, 31, 32 of FIG. 1, where the output of limiter 28 is thereby insensitive to changes in the signal M in the low M region 30, is generally proportional thereto in the intermediate region 31, and is again substantially independent thereof in the high M region 32. The limited output of circuit 28 is supplied to Mach speed pulse-width gain control 34, which circuit utilizes an amplifier-comparator-triangular wave generator system similar to elements 183, 185, 188 of the processor device 160 as shown in FIG. 2. The amplifier-comparator-triangular wave combination of device 34 produces a pulse width modulated wave train, again generally similar to wave train 160a. The output of Mach speed pulse-width control 34 is supplied via lead 27 to control the effective gain of the air speed error gain multiplier 25. As seen in FIG. 2, the variably modulated wave train on lead 27 is coupled to shunt switch 130, which is rendered conducting or non-conducting for periods of time determined by the relative widths of the successive pulses of the wave train on lead 27. Thus, the effective signal flowing through gain multiplier 25 from terminal $e$ to terminal $f$ is varied as a function of the Mach speed of the aircraft according to the curve 30, 31, 32. Where desired, a second shunt switch 131 may be provided in multiplier 25 which like shunt switch 130, is capable of dropping the potential of the common junction between resistors 133, 134 to substantially ground potential. Shunt switch 131 may be used to permit a logic signal from the $N_1$ control to over-ride the control by shunt switch 130 in the event of danger of overboost of the craft engine. It will be understood that the air speed gain multiplier 25 may be similar to gain multiplier 52 or that other known variable gain or multiplier circuits may equally well be substituted.

Basically, the function of gain multiplier 52 and of its associated circuits is to provide the arbitrary normal variation of gain with Mach speed represented by the curve 55, 57, 59 of FIG. 1. This low or normal function is provided by the operational amplifiers 116 and 121 responsive to the output of Mach speed generator 6. Diodes 120, 123 associated with amplifier 121 determine in the conventional manner the location of inflection points 60, 61 of the low or normal characteristic curve. In the example illustrated, which concerns a DC-10 aircraft system, a full unity gain is provided for M values up to about 0.325, whereupon the gain drops substantially linearly to 0.1 at inflection point 61 located about $M=0.80$. The gain remains substantially constant at 0.1 for M values above 0.80. The outputs of amplifiers 116, 121 are seen to be connected in parallel as voltages $V_2$ and $V_3$ into the processor 160 of FIG. 2.

Gain multiplier 52 is understood to be controlled so as to provide an increase in gain of processor 160 over and above its normal or low gain curve as a function of certain relatively unusual conditions. This condition is illustrated in FIG. 1 where the high gain curve 55, 56, 58 is then employed, the gain at the high inflection point 62 being raised with respect to that at inflection point 61. In the same example involving a DC-10 aircraft, the full unity gain situation of curve segment 55 remains while the gain at $M=0.80$ is increased to 0.5 at inflection point 62; curve segment 56 is again substantially linear between inflection points 60, 62 while the gain above $M=0.80$ remains constant at about 0.5. The shift from and back to the low or normal gain curve 55, 57, 59 with respect to the high or upper limit gain curve 55, 56, 58 is usually a transient operation, as will be further described. As has been seen in connection with FIG. 2, switching from one gain characteristic to the other is controlled by switches 136, 140, 143 simultaneously connecting upon their operation the Mach voltages $V_2$ and $V_3$ and reference voltage $V_4$ of terminal 106 to ground through respective resistors of suitable value, including resistors 137, 139, and 142, thus to provide a desired voltage level of corresponding amplitude at the input of integrating amplifier 183.

As mentioned in the foregoing, it is desired to increase the gain of the throttle control system under particular circumstances, particularly when the human pilot selects a new craft air speed or when a flight path change results in a descent rate of arbitrary magnitude, such as 400 feet per minute. To select the new air speed, the pilot may use conventional apparatus, rotating a knob on the air speed indicator which sets a reference or command air speed mechanical index to the desired air speed. This operation may be accomplished as in FIG. 3a of the aforementioned Miller U.S. Pat. No. 3,522,729 or as in FIGS. 2 and 15 of the Miller U.S. Pat. No. 3,691,356. As in the present FIG. 1, the air speed selector knob 4a may set the wiper of a potentiometer within $V_{CMD}$ generator 4 so as to generate the signal $V_{CMD}$ on lead 10. The signal of value $V_{CMD}$ is coupled by lead 11 to the rate circuit 92 of FIG. 2, which rate circuit may have a characteristic transfer function $K_7s/(K_7 + 1)$ where, for the example of the DC-10 system, $K_7 = 3$. The modified output of rate circuit 92 is applied to the input of an operational amplifier 93 for the control of the absolute value detector 96. Detector 96 is designed in the conventional manner to produce a triggering output when the absolute value of $V_{CMD}$ reaches a predetermined level. In this manner, rate circuit 92 is instrumental in effecting a system gain change only when a substantial change of air speed is commanded; its operation in this desired manner depends upon the generally valid assumption that the human pilot will always rotate knob 4a at a relatively high rate when he selects any large air speed change. A study of the usual operating practice also shows that small adjustments of air speed are normally made slowly, which observation is compatible with the fact that a change in gain of the craft throttle system is not needed for such small adjustments.

The triggering output of absolute value detector 96 is applied to multivibrator 97 which thereupon typically provides a 10 second output pulse of a normalized unity amplitude to one input of OR gate 98. The craft air speed error signal is applied by operational amplifier 81 to an absolute value detector 84 generally similar to detector 96. Associated with amplifier 81 is an R-C network 83 whereby the combined circuit behaves as a low pass filter network having the general transfer function $1/(K_6s + 1)$ wherein, for the DC-10 example, $K_6 = 5$; thus, the circuit output has removed from it transients that might falsely trip logic circuits yet to be discussed in further detail. The smoothed or integrated air speed error output of amplifier 81 is then coupled to detector 84 which generates, in a conventional manner, a similar normalized unity magnitude output pulse whenever the air speed error reaches a predetermined value. When they occur, the normalized outputs of OR gate 98 and of detector 84 are supplied to AND gate 88, whereupon AND gate 88 latches itself by virtue of the continuing fed back signal applied via leads 100, 101 to a further input of OR gate 98. It will be apparent that the function of the ten second one-shot multivibrator 97 is to extend the life of the otherwise short-lived $\dot{V}_{CMD}$ signal to assure that enough time is allowed for the air speed error voltage level to build up to its threshold value, thereby assuring that AND gate 88 produces an output and latches itself. The output of AND gate 88 is applied to the further OR gate 104 via leads 100 and 102 and is also used to trigger the sixty second one-shot multivibrator 103, the output of which is supplied to the same OR gate 104. As has been described, this output of OR gate 104 causes shunt switches 136, 140, 143 to conduct in such a manner as to shift the effective gain of processor 160 to the high gain curve 55, 56, 58 of FIG. 1.

During the normal cruise mode of the craft, the engine throttles 74 are set fairly close to their full throttle positions. Should a climb be commanded, throttle response is not critical and the throttles are therefore allowed slowly to increase thrust. However, under the same cruise conditions, should a particular rate of descent be commanded as when moving the craft to cruise at a lower altitude, the downward pitch of the craft rapidly increases air speed toward a value that would be unsafe if not counteracted. During this situation of rapidly increasing air speed, a high response of the throttle control system is required. Thus, if such a flight path maneuver results in a rate of descent of more than some predetermined value, such as 400 feet per minute, this relatively high rate is sensed by the $V_{CAS}$ air data computer 1 and a corresponding normally steady alerting signal is supplied to one input of OR gate 98. Use of this normally steady signal has the advantage that no time delay element is required to assure the simultaneous presence of the alerting signals.

The $\dot{h}$ signal output of operational amplifier 111 is also coupled as a further input to OR gate 98 as a further alerting signal. Thus, the presence of one or the other or both of the alerting signals at two of the inputs of OR gate 98 assures in a failure safe manner a latched output under the desired circumstances from AND gate 88 and provides the consequent reliable operation of OR gate 104 of shunt switches 136, 140, 143. It will be apparent to those skilled in the art that the sensitivity of the system to the magnitude of the $\dot{h}$ signal may be adjusted simply by adjusting the bias level of amplifier 111, as by adjustment of variable resistor 110. It will be seen that during an increasing air speed situation, the high gain control characteristic 55, 56, 58 provided by the invention yields a high system response for the automatic throttle control, a response that quickly and safely reduces the craft air speed error to zero. As that error decreases toward zero, the input to AND gate 88 ultimately necessarily disappears and the circuit associated with AND gate 88 automatically unlatches. Actual unlatching of AND gate 88 is, of course, delayed because of the effect of the sixty second multivibrator 103, so that the high gain characteristic prevails for an additional sixty second period to assure that throttle position overshoots are quickly damped to null. After the time delay, the system automatically reverts to operation in its low gain mode.

Accordingly, it is seen that the versatile automatic throttle control of the present invention serves to overcome the problems associated with prior art systems by providing two basic gain control functions. A first gain control desirably provides for continuous variation of the air speed error signal as a function of Mach speed, while a second desirably provides for temporary variation of the throttle rate command as a function of commanded air speed, air speed error, altitude rate, and aircraft Mach speed. The first gain variation serves to prevent the system from becoming underdamped because of the inherent lengthening of the basic aircraft time constant with increased air speed and also due to the reduction in system gain inherent in the characteristic of the second gain control. The second gain control basically varies the throttle rate command signal as a dual slope function of Mach speed (a function having a high gain slope or low gain slope). Thus, the throttle control system gain program of the present invention serves to provide the desired reduction in the throttle activity during the higher speed cruise modes, yet provides high response to air speed and flight path changes. At the same time, desirable system damping characteristics are maintained during all modes of operation of the aircraft. Accordingly, it is seen that the invention provides reliable and desirable control over all modes of flight, providing a fully suitable servo loop gain for the throttle control system, the gain in use being optimum for the selected flight mode.

While, in the specific embodiments illustrated, Mach air speed is illustrated as the primary gain controlling parameter, it will be understood that true air speed may be preferred where readily available. However, Mach air speed is a very close approximation of true air speed; therefore, in the detailed presentation of the invention and in the claims which follow it will be understood that Mach speed and true air speed may be used interchangeably.

While the invention has been described in its preferred embodiments, it is to be understood that the words which have been used are words of description rather than of limitation and changes within the purview of the appended claims may be made without departure from the true scope and spirit of the invention in its broader aspects.

I claim:

1. In a variable gain engine throttle control system for an aircraft:
   computer means for generating a signal representative of craft air speed error,
   first gain control signal generator means responsive to craft air speed for generating a signal representative of craft air speed,
   first gain multiplier means in series relation with said computer means output and responsive to said first gain control signal generator means signal,
   second gain control signal generator means responsive to said computer means output, to a signal representative of commanded craft air speed, to a signal representative of craft altitude rate, and to a signal representative of craft air speed for generating a composite control signal,
   second gain multiplier means in series relation with said first gain multiplier means and responsive to said composite control signal, and
   engine throttle control means responsive to said second gain multiplier means.

2. Apparatus as described in claim 1 further including time rate circuit means for modifying the output of said first gain multiplier means before application to said second gain multiplier means.

3. Apparatus as described in claim 2 further including:
   sensor means for generating a signal representative of aircraft acceleration along the aircraft flight path, and first summation means for combining the output of said first gain multiplier and said signal representative of aircraft acceleration for application to said rate circuit means.

4. Apparatus as described in claim 3 further including second summation means for combining the modified output of said rate circuit means with said signal representative of craft air speed error and with a signal representative of craft air speed time rate of change prior to application to said second gain multiplier means.

5. Apparatus as described in claim 2 wherein said first gain control signal generator means is characterized by a first gain control characteristic for providing a first substantially constant output for a first low range of craft air speeds, a second substantially constant output for a first high range of craft air speeds, said second constant output having a greater magnitude than said first constant output, and a substantially linearly increasing output for a range of increasing craft air speeds intermediate said first low and first high ranges of craft air speeds.

6. Apparatus as described in claim 5 wherein said second gain control signal generator means is characterized by at least a second gain control characteristic for providing a third substantially constant output for a second low range of craft air speeds, a fourth substantially constant output for a second high range of craft air speeds, said third constant output having a greater magnitude than said fourth constant output, and a substantially linearly decreasing output for a range of increasing craft air speeds intermediate said second low and second high ranges of craft air speeds.

7. Apparatus as described in claim 2 wherein said second gain control signal generator means includes:
coincidence detector means having first and second input means,
first detector means responsive to said air craft speed error signal for providing a first unipolar output to said first input means,
differentiator means responsive to said signal representative of commanded craft air speed,
second detector means responsive to said differentiator means for providing a second unipolar output to said second input means, and
gate circuit means responsive to the simultaneous presence of said first and second unipolar signals at said first and second input means for controlling said second gain multiplier means.

8. Apparatus as described in claim 7 additionally including:
first, second, third, and fourth impedance means connected in parallel by nodal conductor means and each having a respective signal input,
said first impedance means input being supplied with a first reference potential,
said second impedance means input being supplied with said signal representative of craft air speed,
said third impedance means input being supplied with a modified version of said craft air speed signal, and
said fourth impedance means input being supplied with a second reference potential.

9. Apparatus as described in claim 8 further including:
dual state multiple switch means responsive to said gate circuit means output for determining the respective input signal levels at said second, third, and fourth, impedance means inputs.

10. Apparatus as described in claim 9 including analog-to-variable pulse-width pulse output signal converter means for converting said gain changing output at said nodal conductor into variable width pulses for controlling the effective gain of said second gain multiplier means.

11. Apparatus as described in claim 10 wherein said second gain multiplier means includes switch means for cyclically connecting the output of said converter means to and from ground potential in synchronism with said variable pulse width pulse output signals.

* * * * *